Sept. 1, 1942.  W. A. BRUNO  2,294,737
ELECTRIC CONNECTOR
Filed Oct. 18, 1940

INVENTOR
William A. Bruno
BY
ATTORNEY

Patented Sept. 1, 1942

2,294,737

UNITED STATES PATENT OFFICE 2,294,737

ELECTRIC CONNECTOR

William A. Bruno, Astoria, N. Y., assignor, by mesne assignments, to Bruno Patents Inc., Long Island City, N. Y., a corporation of New York Application October 18, 1940, Serial No. 361,681

2 Claims. (Cl. 173—328)

The present invention has to do with the distribution of electricity, and relates to improvements in flexible and adaptable circuits, especially to electric couplers or connectors by which said circuits can be safely closed and opened.

The principal object of this invention is to provide an electric coupler or connector in which the safe connection of the separable main parts is not affected by the action of shocks, vibrations or other similar influences to which said connector or coupler may be subjected, for example in moving vehicles, such as particularly airplanes.

Another object of my invention is to provide an electric coupler or connector of the above mentioned character, of which the main parts can be manufactured in a simple and economical manner.

A further object of this invention is to provide an electric coupler or connector, the parts of which can be easily and quickly connected, and cannot be accidentally connected or disconnected.

Other objects and advantages of the invention will be apparent from the following description which, taken in connection with the accompanying drawing, discloses a preferred embodiment thereof.

A well known type of electric couplers or connectors consists of two separable main parts, so-called "female part" and "male part," which are adapted to be screwed together. Said female part may, for example, comprise a tubular metallic member which receives the electric conductors, and said male part may comprise an externally threaded metallic member receiving the electric conductors, and said female part and said male part may be adapted to be screwed together, by means of a cap screw, for example. Although, in general, connectors of this type have proved satisfactory, it has been found that, when subjected to shocks, vibrations or similar influences, for example in fast moving vehicles, particularly airplanes, the male part of the connector is liable to work loose, and to cause interruption of electric connection and/or other inconveniences.

According to my present invention, this disadvantage can be avoided by providing in an electric coupler or connector two separable main parts which are adapted to be screwed or locked into a tight, vibration-proof and shock-proof engagement. According to a preferred embodiment of my invention, the electric coupler or connector may comprise an externally threaded tubular male part to be screwed together with a female part, said externally threaded tubular male part being provided with at least one suitably formed and arranged slot and being slightly deformed to a slightly oval shape. Owing to the resilience caused by the presence of said slots, the slightly oval, threaded, tubular male part can be screwed or locked into a tight, engagement with the corresponding internally threaded element of said female connector part. The tight enagagement thus attained is not substantially affected by the above mentioned influences, such as shocks or vibration.

Referring to the drawing.

Figure 1:
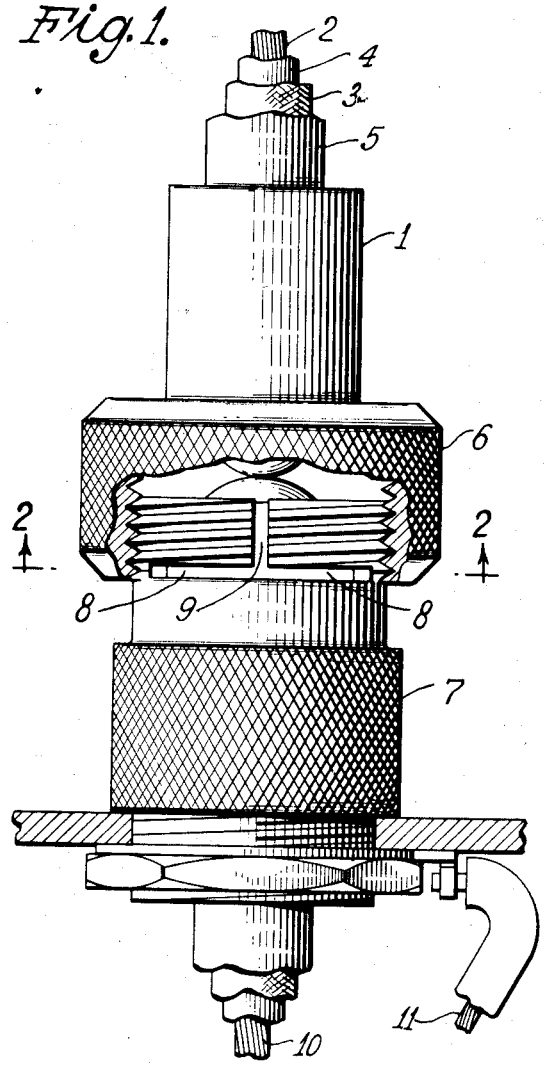
Fig. 1 is an elevational view of a preferred embodiment of my invention, partly broken away.
Figure 2:
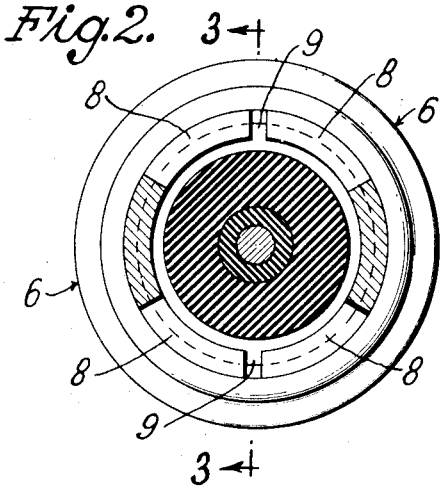
Fig. 2 is a cross-section on line 2—2 of Fig. 1.
Figure 4:
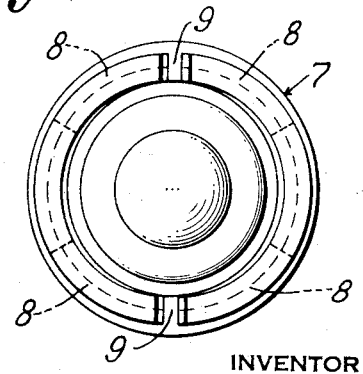
Fig. 4 is a top view of the slotted, threaded portion of the tubular male member.

Referring to Figs. 1 and 2, the connector shown comprises two separable main parts, a female part, and a male part. The female part comprises a tubular metal casing or housing 1 which receives the electric conductors 2 and 3, provided with insulations 4 and 5. Tubular part 1 is provided with a cap screw 6. The male part of the connector comprises an externally threaded tubular metallic member 7, the threaded part of which is provided with two oppositely arranged horizontal slots 8, 8. Each of these horizontal slots is connected with a longitudinal slot 9, 9, which is substantially parallel to the axis and extends to the open end of the threaded portion of said tubular male part. The horizontal slots and longitudinal slots thus form oppositely arranged inverted T-shaped slots, and said tubular, threaded, and slotted portion of the male connector part is slightly deformed to a slightly oval contour as shown in Fig. 4. Electric conductors 10 and 11 are connected with the male connector part. Owing to the presence of said inverted T-shaped slots, and the slightly oval contour of the threaded portion of the male connector part, the latter can be easily screwed together with the female part into a tight, vibration-proof and shock-proof engagement.

Figure 3:
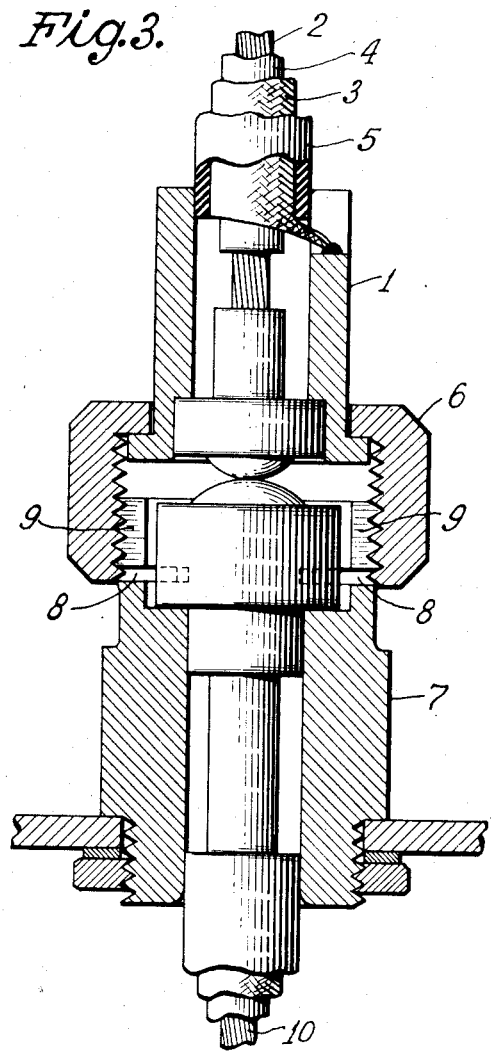
Fig. 3 is a sectional view of the embodiment shown in Figs. 1 and 2, on line 3—3 of Fig. 2.

The above mentioned horizontal slot 8 and the longitudinal slot 9 connected therewith is also shown in the sectional view in Fig. 3.

I have shown a preferred embodiment of my invention, but it will be obvious from the above that the invention is not limited to the specific construction and arrangement of elements shown, but that the principle and underlying novel concept as described, are susceptible of numerous modifications and embodiments coming within the scope of invention as defined by the appended claims. The specification and drawing are accordingly intended to be regarded in an illustrative rather than in a limiting sense.

I claim:

1. In an electric connector comprising a female part provided with an internally threaded tubular member, and an externally threaded tubular male part which is provided with two oppositely arranged inverted T-shaped slots, each of which consists of a longitudinal slot and a peripheral slot connected therewith, the threaded portion of said tubular male part having a slightly oval contour, said male part, owing to the resilience caused by the presence of said slots, being adapted to be screwed into a shock- and vibration-resistant engagement with said female part.

2. In an electric connector comprising a female part provided with an internally threaded tubular member and an externally threaded tubular male part which is provided with two oppositely arranged inverted T-shaped slots, each of which consists of a longitudinal slot substantially parallel to the axis of said tubular male part and extending to the open end of the threaded portion thereof, and a peripheral slot connected therewith and forming substantially a right angle therewith, the threaded portion of said tubular male part having a slightly oval contour, said male part, owing to the resilience caused by the presence of said slots, being adapted to be screwed into a shock- and vibration-resistant engagement with said female part.

WILLIAM A. BRUNO.